United States Patent [19]

Negrich, Sr., deceased et al.

[11] 4,280,264

[45] Jul. 28, 1981

[54] METHOD FOR FABRICATING LARGE DIAMETER GEARS, GEAR-BLANKS AND THE LIKE

[76] Inventors: George Negrich, Sr., deceased, late of Bedford, Ohio; by Helen Negrich, executrix, 711 Archer Rd., Bedford, Ohio 44146

[21] Appl. No.: 37,921

[22] Filed: May 9, 1979

[51] Int. Cl.³ .................... B21D 53/28; B21K 1/30; B21H 5/00

[52] U.S. Cl. ................... 29/159.2; 29/159 R; 228/17; 228/173 E

[58] Field of Search .................... 29/159 R, 159.2; 228/17, 173 A, 173 C, 173 E, 173 R

[56] References Cited

U.S. PATENT DOCUMENTS

| 1,444,002 | 2/1923 | Mossberg | 29/159 R |
|---|---|---|---|
| 1,641,440 | 9/1927 | Kelleher et al. | 29/159.2 UX |
| 1,908,187 | 5/1933 | Ross | 29/159.2 |
| 2,062,415 | 12/1936 | Harrison | 29/159 R |
| 2,730,795 | 1/1956 | Bloss | 29/159 R |
| 2,749,607 | 6/1966 | McIlvane | 228/173 E X |
| 3,230,616 | 1/1966 | Janssen | 29/159.2 X |
| 3,427,427 | 2/1969 | Rudd | 228/173 C X |
| 3,578,445 | 5/1971 | Elchisak et al. | 228/173 C X |
| 3,831,243 | 8/1974 | Conrad | 29/159 R X |
| 4,000,634 | 1/1977 | Hixson | 29/159 R |
| 4,069,572 | 1/1978 | Pierce et al. | 29/159 R |
| 4,118,848 | 10/1978 | Goldschmidt et al. | 29/159.2 |

FOREIGN PATENT DOCUMENTS

| 151663 | 6/1904 | Fed. Rep. of Germany | 29/159.2 |
|---|---|---|---|
| 130995 | 11/1919 | United Kingdom | 29/159.2 |

*Primary Examiner*—Lowell A. Larson
*Attorney, Agent, or Firm*—Robert Bruce Henn

[57] ABSTRACT

A circular centrally-apertured precision torch-cut web disk plate is drivingly rotatably supported between two clamp plates; and the leading end of straight rim strip stock, of length requisite for the tooth bearing rim of the gear, is positioned adjacent the web disk edge and is forced by a floating forming roll pair into conformity with the disk edge, and tack welded in the conformed rim length portion to the disk edge. By driving advance or rotation of the disk, the rim strip is drawn under the forming rolls, continuously forming it to the disk edge, to which the strip is continuously welded as formed. A complete rotation of the disk results in the strip conformed to and welded to the disk periphery as a rim flange, with strip ends brought into adjacent and near-abutting relation, said ends being transversely fill-welded together thus to form a gear blank. Thereafter with or without a hub element centrally located and welded in place, the gear blank is machined to finish various areas, and to cut gear teeth in its periphery by known and appropriate means.

Machine structures for drivingly rotating web disks respectively in a vertical or a horizontal plane, and including a floating forming roll carrying head advanceable and retractable by hydraulic cylinder means, are disclosed with simultaneous welding of both sides of the web disk to the rim stock or, in the case of horizontal disposition, welding of a single side, whereafter the partially completed weldment is inverted for a 360° weld applied to the other side.

In the machine, the web disk workpiece is clamped between opposed clamp plates. One clamp plate is rotationally driven and axially fixed. The other plate is hollow and rotatable but axially shiftable for workpiece insertion, clamping and removal. The clamp plates and web disk have a plurality of alignable drive pin-receiving apertures. A centering rod can be fed through the shiftable hollow plate into a preliminary centering engagement with the web disk central aperture if desired before clamping is achieved by hydraulic advance of the shiftable clamp plate. A floating roll-carrying head is advanced and retracted by hydraulic cylinder means.

11 Claims, 12 Drawing Figures

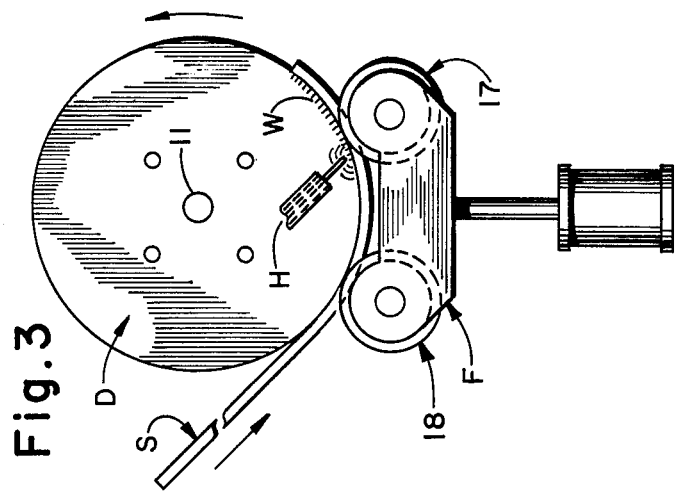
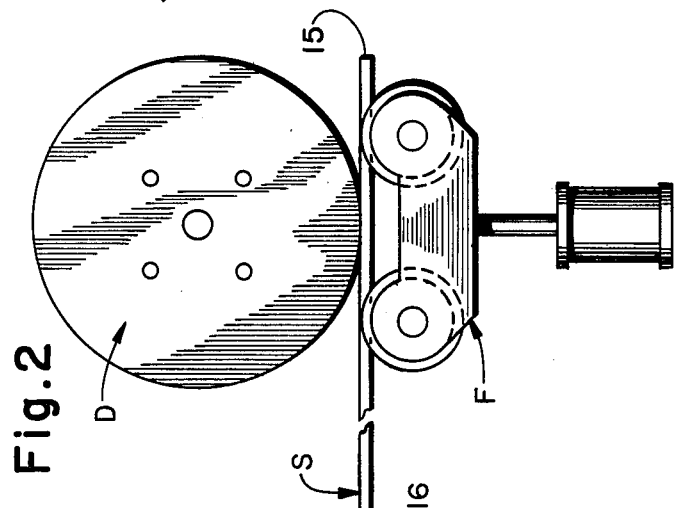
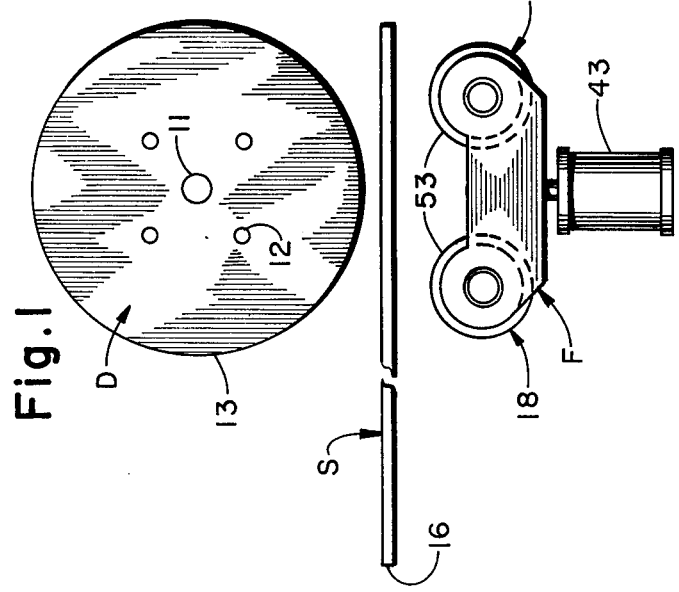
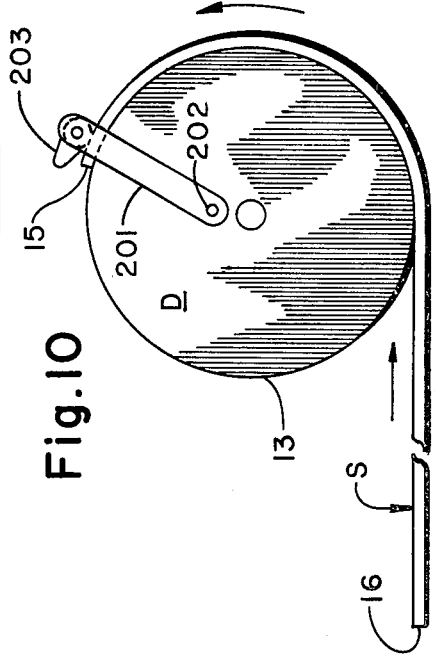
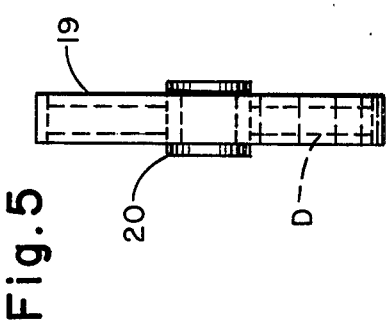
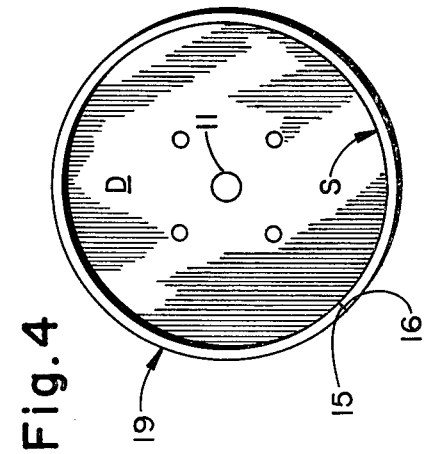

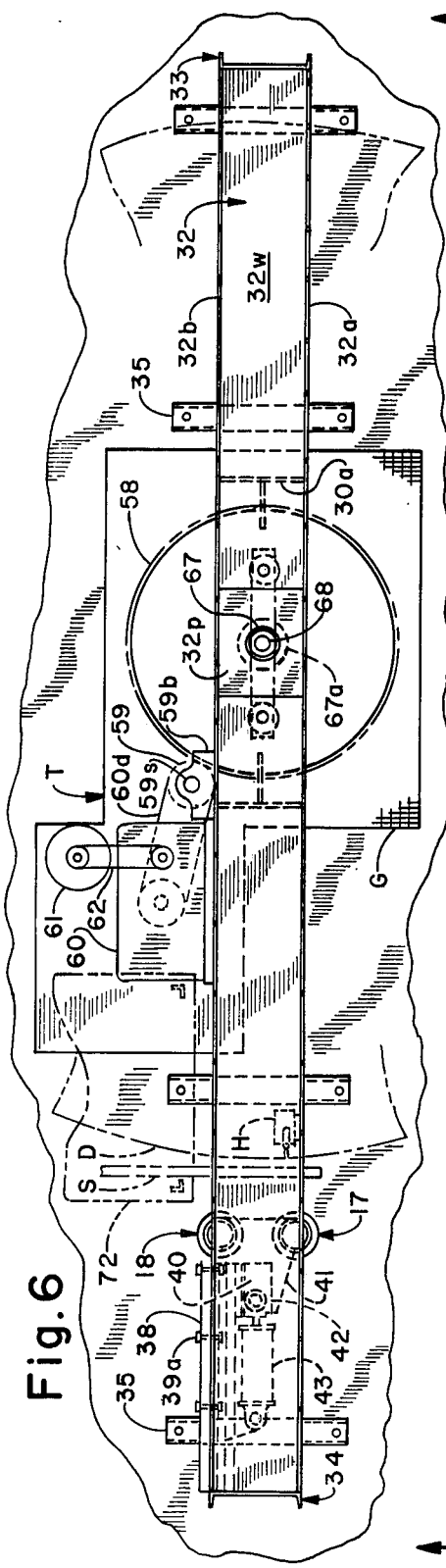
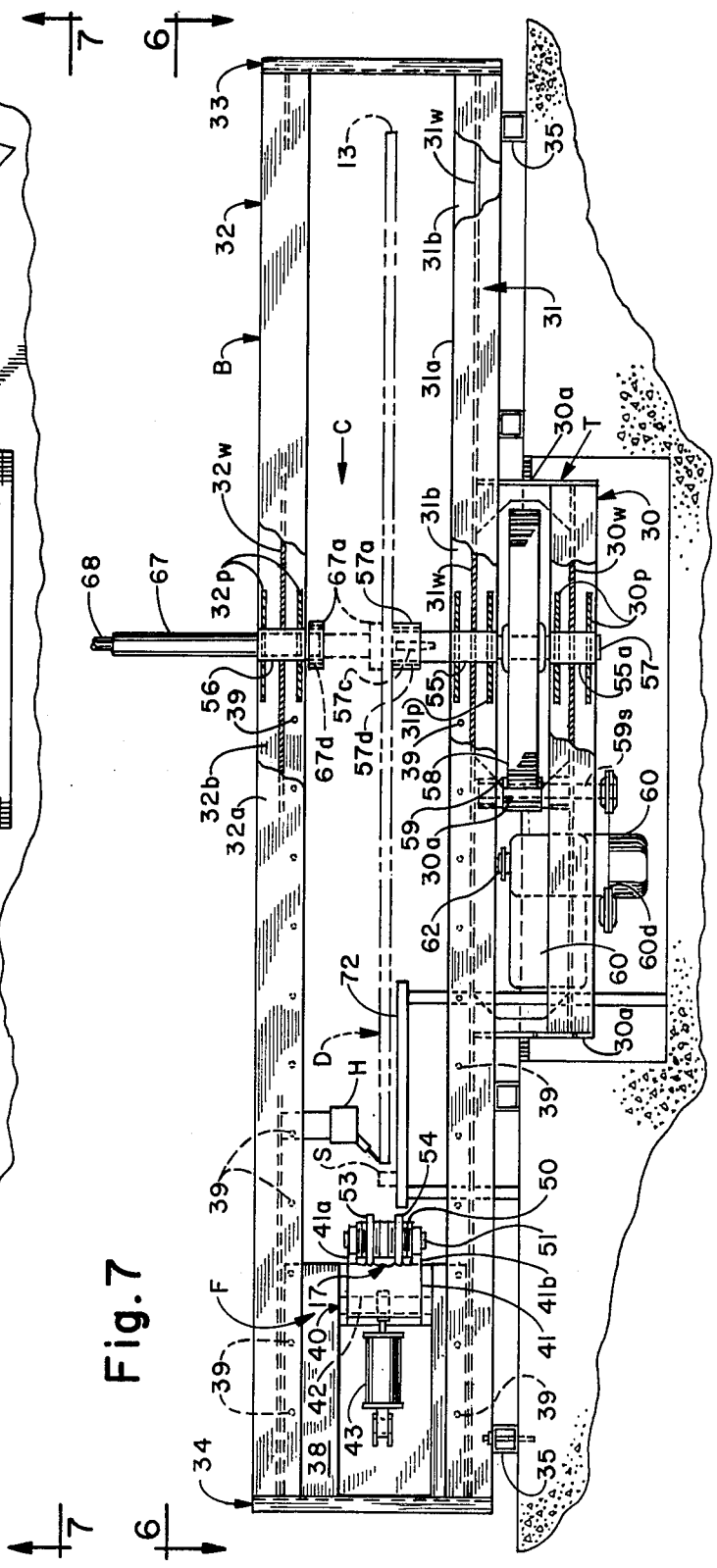
Fig.6
Fig.7

METHOD FOR FABRICATING LARGE DIAMETER GEARS, GEAR-BLANKS AND THE LIKE

BACKGROUND OF THE INVENTION

This invention is in the field of large gears; and more particularly, it relates to an improved method, and apparatus or machine for the fabrication of gears.

Various methods have been used for the fabrication of large gears, from about two feet in diameter on up to 20 feet and larger, depending upon the precision requirements in the gear, its size, physical characteristics required in the material, and the advance of technology.

To avoid the tremendous amount of work, material consumption and energy required in "whittling" or machining a large integral gear out of a single piece of metal, because of high costs, or actual limitations of the available facilities, techniques, machine tools and the like, one early approach was to cast the gear in half or smaller sectors to approximate form. The sectors are then bolted or otherwise secured together, and the cast elements, usually as assembled, thereafter being machined with the required accuracy in the shaft or hub bore, and in the teeth, which can be partially formed by casting in a rim flange structure of the casting or cast assembly.

The various parts of the machined gear element thus produced might be subjected to appropriate metal or heat treating and the like to develop requisite or desired properties at various parts of the structure.

The gears or components can be cast of appropriately formulated special cast iron, or cast steel or steel alloys or of other metals.

At the present time certain gears even in quite large sizes, for some special applications or environments of gear use, the fabrication technique is first to produce a cast gear blank of appropriate size, shape and form approaching as near as possible the ultimately desired gear product shape and dimensions, and thereafter accurately to machine the blank with teeth, and other parts of the gear as now possible with modern machine tooling and facilities.

However, for many years and to the present, the fabrication technique has generally involved the production of a gear blank as a weldment comprised of a web disk plate and a formed ring element fitted or forced onto and welded to the web disk periphery, with certain oversizes in various dimensions; the gear blank is then appropriately machined for face, edge and other dimensions and finally subjected to appropriate machine operations to provide the rim flange with accurately cut teeth of desired size and form.

Usually thereafter the web disk plate is appropriately centrally apertured to receive a solid or hollow cylindrical hub piece which is welded in place. The hub is then machined with a shaft bore and to appropriate axial dimensioning; or an already present central hole can be reamed or bored as a shaft receiving bore coaxial with the pitch circle of the already formed teeth.

However, though apparently less preferred in modern technology, it is possible though usually less convenient, for the hub stock material be incorporated into the weldment before the production of the teeth and other machining.

The present invention is more particularly concerned with an improved method, and apparatus or machine for carrying out the method, for fabrication of gears by production of a weldment gear blank form involving at least a circular web disk plate and a rim flange formed to a closed annular form about and weld-secured on the periphery of the web disk plate.

In the prior art, weldment type gear blanks have been made by first producing a circular web disk plate and a separate ring-formed rim element, the latter produced from straight strip stock of requisite length performed to annular form with rim free ends then being secured or welded together to close the ring. The ring placed about the web disk and secured to the web disk periphery by a welding bead peripherally layed continuously circumferentially between ring and web on both sides of the web.

Ross U.S. Pat. No. 1,908,187 of 1933 uses this method; and then also welds a hollow hub element into place at the central aperture of the disk to provide the complete gear blank weldment; with special concern about using diverse steels in the three components for obtaining different properties in the corresponding regions of the final gear.

Such procedure requires the setting up of equipment for forming the ring and thereafter jigging or setting up a circular web disk plate with the preformed welded ring element properly located thereabout for the operation of welding ring to web.

Where there are slight irregularities on the web disk plate periphery, as indeed there may be even with modern precision torch cutting equipment with which such a web disk may be cut from rolled plate stock, there may be some awkwardness in time consuming operations in bringing the preformed ring into appropriate position. This is especially true in such cases where the preformed ring has been welded closed at its ends. On the other hand, where the ring is not welded closed, it usually requires more complicated jigging. Similar difficulties may arise from out-of-roundness of the ring thus preformed.

By this method approach it can be seen that there is the disadvantage of setting up work in the first instance say for the ring forming from strip stock, and then the welding of the ends thereof, followed by a second set up operation and jigging to bring the ring and the web disk into proper relationship for the circumferential welding as required.

SUMMARY OF THE INVENTION

A circular centrally-apertured precision torch-cut web disk plate is drivingly rotatably supported between two clamp plates; and the leading end of straight rim strip stock, of length requisite for the tooth bearing rim of the gear, is positioned adjacent the web disk edge and is forced by a floating forming roll pair into conformity with the disk edge, and tack welded in the conformed rim length portion to the disk edge. By driving advance or rotation of the disk, the rim strip is drawn under the forming rolls, continuously forming it to the disk edge, to which the strip is continuously welded as formed. A complete rotation of the disk results in the strip conformed to and welded to the disk periphery as a rim flange, with strip ends brought into adjacent and near-abutting relation, said ends being transversely fill-welded together thus to form a gear blank. Thereafter with or without a hub element centrally located and welded in place, the gear blank is machined to finish various areas, and to cut gear teeth in its periphery by known and appropriate means.

Machine structures for drivingly rotating web disks respectively in a vertical or a horizontal plane, and including a floating forming roll carrying head advanceable and retractable by hydraulic cylinder means, are disclosed with simultaneous welding of both sides of the web disk to the rim stock or, in the case of horizontal disposition, welding of a single side, whereafter the partially completed weldment is inverted for a 360° weld applied to the other side.

In the machine, the web disk workpiece is clamped between opposed clamp plates. One clamp plate is rotationally driven and axially fixed. The other plate is hollow and rotatable but axially shiftable for workpiece insertion, clamping and removal. The clamp plates and web disk have a plurality of alignable drive pin-receiving apertures. A centering rod can be fed through the shiftable hollow plate into a preliminary centering engagement with the web disk central aperture if desired before clamping is achieved by hydraulic advance of the shiftable clamp plate. A floating roll-carrying head is advanced and retracted by hydraulic cylinder means.

BRIEF DESCRIPTION OF THE DRAWINGS

FIGS. 1, 2, 3 and 4 schematically show successive steps in a characterizing portion of the present improved method, whereby a gear blank or weldment is produced;

FIG. 5 is an edge elevation of a product of the method represented in FIGS. 1-4, whereof FIG. 4 also in effect gives a plan view of the product;

FIG. 6 is a plan view of an apparatus for production of larger size gear blank weldments wherein the web disk is disposed generally horizontally for rotation about a substantially vertical axis, certain clamping actuating structure being omitted here (and so also in FIG. 7) for clarity;

FIG. 7 is a side elevational view taken along line 7—7 in FIG. 6;

FIG. 10 is a schematic plan view showing a stripstock securing means modification;

DESCRIPTION OF THE PREFERRED EMBODIMENTS

Figure 9:
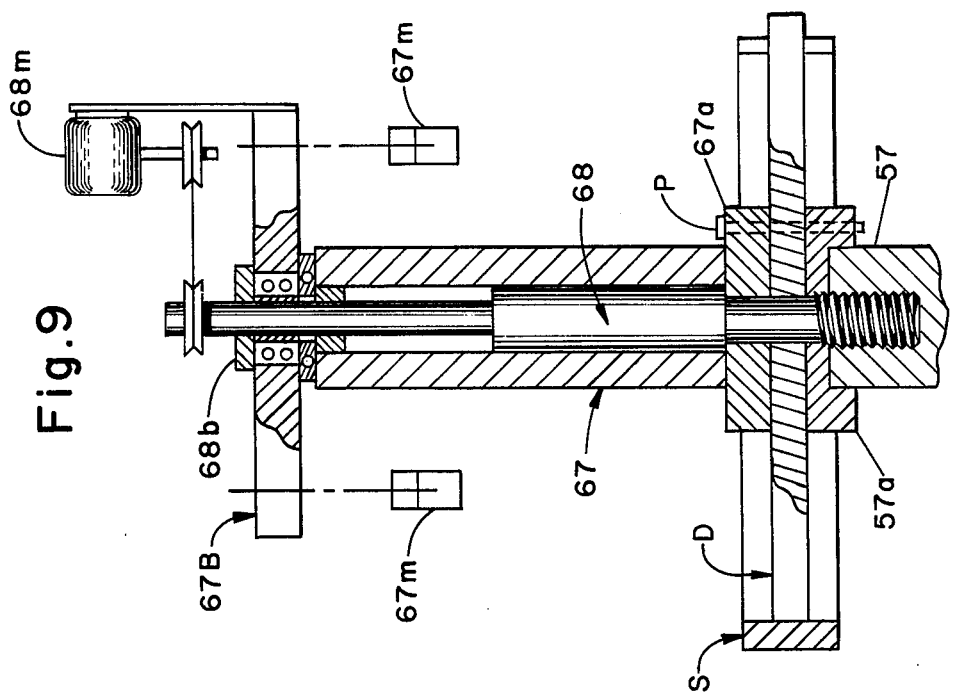
FIG. 9 is a partially diagramatic view of another form of clamp-actuation alternate to FIG. 8 wherein a mechanical jack screw is used.

In the present invention a circular web disk is produced from a suitable material such as rolled steel plate of appropriate thickness and composition, for example by precision oxygen-gas torch cutting. Conveniently the web disk is provided with a fairly precisely located center aperture, and equally spaced therearound radially, a plurality of drive means engagement apertures. Rim stock material is continuously formed and welded to the periphery of the disk. The latter is provided by a straight piece of flat strip or bar steel stock, in length corresponding to the circumference of the disk, with excess thickness and width to be later machined to precise dimensions. One end, a leading end, of the rim strip is positioned adjacent the disk edge. A pair of forming rolls which are advanced radially toward the web disk bring the rim into accurately conformed relation with the web disk edge.

The rim strip end is then secured to the disk, by clamping or welding; e.g., by a tack weld to the disk edge then made in the arcuately conformed strip end region. Thereafter, with the rolls kept advanced towards the disk edge, the disk is rotationally power driven to draw the remaining length of the rim strip under the rolls thereby forming it against the disk edge. Simultaneously with that forming, the rim is continuously welded, for example by submerged electric arc welding, thereto about the entire circumference of the disk.

When the web disk is thus rotatably driven in a vertical plane, about a horizontal axis, with the rim strip stock being fed in at the bottom region, it is convenient to weld by submerged arc welding. A welding bead can be laid continuously and simultaneously on both sides of the disk securing it to the ring. Where because of size or other considerations, the web disk is rotatably driven in a substantially horizontal welding plane, about a substantially vertical axis welding, by submerged arc welding equipment and methods is available. A first weld bead is made on one side about the complete circumference; and thereafter the semi-finished blank is inverted and a second bead in similar position is laid on the other side.

In either type of operation, vertical or horizontal, the adjacent ends of the strip, thus conformed to the edge and welded in place, are themselves welded together often with a filling weld.

At times, by the heaviness of the strip stock, or by the instantaneous geometry of the situation, emplacement of the paired rolls, particularly the trailing roll, i.e., the roll closest to the very leading end free edge, there may be a slight tangent projection of the strip extreme leading end portion, e.g., beyond the trailing roll. In such case, if desired, after a tack weld is first made as close as possible to that roll in the conformed arcuate section of the strip, the disk is driven in effect reversally, to bring the tangent free end further under that adjacent roll, thus bending the strip end completely into conformity at the leading end. A further tack weld may be then made at the extreme, now conformed, end. Thereafter when "forward" drive of the disk is begun to traverse the now conformed and tack-welded end, and thereafter to draw the rest of the rim strip between the rolls and the wed disk edge, conforming it to that edge, continuous welding of fillet type bead is carried out. This continuous welding operation may start just beyond the original tack weld, when it has passed a welding head. The disk passes through a complete rotation, thereby conforming the rim strip, and welding it to the disk edge. The circumferential fillet bead weld can be carried beyond the region on the adjacent strip ends into the extreme forward leading end of the strip which had been conformed from a tangent disposition to the edge of the disk by reverse disk drive at the start of operations. With the rim stock thus in place, a "filling" weld may be applied on either or both the inside and outside of the rim at the region of adjacent or near abutting ends.

Where both sides of the disk have been welded to the rim by welding in this fashion simultaneously as the flange strip stock is applied to the disk edge, for most purposes, the gear blank weldment may be considered completed, unless it is desired that a cylindrical hub core piece be applied before machining of gear teeth or other surfaces of the blank.

On the other hand, if the continuous circumferential fillet weld bead is applied on only one side during the forming of the strip stock to the web disk edge, thereafter, the partially completed weldment is then turned over and the fillet weld applied over the circumference of the other side.

With the rim being formed continuously to the disk edge and being welded in place as formed, there are avoided the prior art difficulties arising from out-of-roundness or disconformities between a preformed ring and the peripheral outline of a web disk, and the disadvantage of multiple set-ups and/or jigging in distinct machines.

Thus a lower cost gear blank is generally producible by the present method because of savings of time and labor.

A gear blank weldment thus produced, with optional intervening stress relief treatment, is next machined to rim size, and to produce the teeth, and thereafter, the hub is supplied and finished.

Apparatus for carrying out the aforedescribed method steps of particular importance comprises a pair of relatively simple sturdy rectangular frameworks or sub-frames in spaced parallel relation defining therebetween in effect an elongated slot as a work-receiving space, the sub-frames being secured together in rigidily spaced parallel relation by end spacer means.

Extending perpendicular to their respective planes, the sub-frames near mid-length have aligned bearing tubes for receiving means for drivingly rotatably and releasably clamping a web disk place workpiece. The axis of the aligned bearing tubes is displaced somewhat off from the middle position towards one end. At the other end, the machine frame supports a base adjustably longitudinally shiftable and supported between the said sub-frames for slidably supporting a forming roll carrying head advanceable and retractable by a fluid power (hydraulic cylinder) unit towards and away from the edge of a web disk supported in the frame. The roll carrying head is pivotally supported by a pivot with axis parallel to the bearing tube axis for a slight pivotal float, and in turn supports a pair of spaced and parallel forming roll assemblies, having axes parallel to each other and parallel to the bearing tube axis.

The roll head support base is thus adjustable along the frame for accommodation of web disk plate workpieces of widely different diameters, by an adjustment for the operative position or for a range of the forming rolls. By use of the hydraulic or fluid cylinder advance and retraction means, the head is operatively advanceable to conform rim strip stock into engagement with a web disk plate edge driven in the machine, and advanceable and retractable for easier working clearance in loading and unloading the machine. Preferably the roll carriage further has a stroke length whereby a certain more limited accommodation for workpiece size is conveniently available without changing the base position.

For the disk clamping and driving means, in one bearing tube there is a drive shaft appropriately axially fixed having on its inner end an axially fixed clamping plate and at its other end bearing a large torque gear, driven through a drive pinion driven in turn by an appropriate gear reduction or speed control until from an electric motor. Appropriate braking and direction controls are provided on or in the motor or in the gear reduction unit or both.

In the other bearing tube a hollow tubular, axially shiftable support element carries a consequentially axially shiftable clamp plate cooperating with the first clamp plate for clamping therebetween a web disk plate. The axially shiftable support may be rotatable or not with an appropriate bearing then provided for the clamp plate. The clamp plates may be changeable for sized. Suitable means such as hydraulic cylinder means or other fluid power means are provided, or alternatively a certain electric motor powered jack screw type clamping arrangement, for advancing the movable clamping plate towards the other.

The axially shiftable hollow support element has further axially slideable therein a web disk centering pin, conveniently by a fluid power cylinder means, advanceable and retractable through and beyond the axially shiftable clamping plate through a centering aperture of the web disk into a piloted engagement in a corresponding coaxially recess of the drive shaft and axially fixed clamp plate. By these means, with a disk plate workpiece placed between the clamp plates, the centering rod or pin may be advanced through the disk center, thereby to locate it and hold it in centered position, while the clamping plates are thereafter being further advanced towards each other for clamping engagement with the disk.

Further, spaced about their respective center apertures, the tube clamping plates and so also the web disk plate workpieces are provided with drive pin receiving apertures, which are alignable for drive pins to be dropped through before the final clamping action by clamp plates. Although a frictional clamping action is attained between the clamp plates, the pin arrangement further importantly provides the primary drive connection between the driving clamping plate and the disk.

There is preferably further provided out of the roll head path some support and guide means for the strip stock being fed into the machine, in addition to a guide function afforded by the roll structure.

Further the machine frame affords support for appropriate welding head means to carry out the welding operations previously described in method discussion. Adjustability here as in other places is provided to accommodate various sizes of workpieces.

In the forming roll supporting head, each of the like rolls may conveniently assume the form of a heavy hollow roll provided at each end with a flat crested Acme heavy external or male thread, whereon there are engaged a pair of correspondingly threaded annular guide rings or disks. The stout hollow roll element in turn is rotatable on a fixed stub shaft with respective opposite ends secured in the roll support head. Therefore the annular guide disks may be carried in spacing from each other along the length of the respective threaded roll, to correspond to or vary correspondingly to the width of the rim stock strip being formed to the web disk edge.

Also since rim stock of different widths and web disk plates or different thicknesses may be involved as workpieces, thus likely shifting the center plane or location of different workpieces relative to the axially fixed clamping plate, especially where the axially fixed clamping plate is not to be changed, the threaded adjustment or shiftability of the disks constituting in effect guide means on each roller means allows them to be shifted as required by the rim stock width to maintain their opposed faces respectively symmetrically located or equi-spaced on opposite sides of the workpiece disk center plane, for a symmetrical application of rim stock to the disk edge. Asymmetrical rims can also be handled.

Where the web disk rotation axis is vertical, that is, the plane of the disk rotation being horizontal, usually the preferred situation for the larger range of disks or blanks, the preferred submerged arc welding by present equipment can be conveniently carried out only from the top of the disk plate. Accordingly a single welding head supported conveniently from a top sub-frame is provided, being adjustable of course therealong as required because of different size workpieces and workpiece diameters.

In the case of smaller weldments or web-disk wordpieces up to about 5 or 6 feet, where the web disk is conveniently mounted in vertical disposition, that is for rotation about a horizontal axis, support 18 is provided for the strip stock near the bottom region of the disk, this being adjustable in radial position relative to the axis of rotation; and dual or opposed welding heads are provided adjustable vertically in the frame on opposite sides of the workpiece disk location.

GENERAL METHOD—FIGS. 1-5

For the key and characterizing steps of the present method of gear fabrication, involving primarily the production of a gear blank weldment, (see FIGS. 1-5), there are provided a circularly edged web plate or disk D cut out of appropriate plate material, usually steel, and having at lease a concentric centering aperture 11, and a plurality of drive engagement apertures 12 equi-spaced on the same circle with respect to 11; and as a second workpiece, a strip of straight flat stock S for the rim flange, in length corresponding to the length of the circumference of the edge 13 of disk workpiece D. It is noted that in these FIGS. 1-5, and also especially FIGS. 8, 9, 11 and 12 for drawing convenience, the work is shown disproportionately small relative to apparatus components.

The leading and trailing end edges 15 and 16 of the strip S may be pre-beveled if desired, so that when S is formed into an annular rim about D by the present method, the ends may be closely spaced and near parallel. However, the ends need not be beveled, but as a filling weld may be used transversely of the blank product as a final operation, this may serve to fill in the gap which will arise between obliquely disposed end faces 15 and 16 as they would otherwise be disposed.

Though usually a simple disk precision gas torch cut from plate stock, the web workpiece D may be in effect spoked, or have other shapes providing a circular edge and a clampable center area; and "web plate" or "disk" as applied to that workpiece are to be understood as comprehending any such useful form of web piece.

The steel, or other metallic material or materials used for D and S are usually of the same general composition for avoidance of certain problems which might otherwise arise, but also for particular purposes, the characteristics desired in the different parts of the ultimate weldment blank product and/or ultimate gear, different materials may be used for S and D as long as they will be weldable to each other by appropriate means, and compatible in the sense of dimensional stability through and after the fabrication process and the like of the final gear product of the method.

The disk D is firmly clamped for rotational support and rotation in a fixed plane about its geometrical axis through the center of 11, being drivable either by friction forces applied to the disk or by further driving means engaging in the apertures 12.

The strip S, appropriately supported, is brought in proximate to the periphery or edge, and with its plane perpendicular to the plane of rotation, i.e., the center plane, of disk D, being located within the path of shiftable forming roll means F (see FIG. 1).

The strip leading end portion engaged between the roll flanges afforded by annular disks 53 and 54 is then brought up against the disk edge (see FIGS. 2 and 7). With the forming roller means F further advanced, the engaged leading end portion of the strip S is locally conformed thereto (see FIG. 3) by the wrapping or forming action of the spaced rollers. At this point of the procedure, a tack weld is made, e.g., by welding head H, in the angle formed between the strip stock S and the disk edge. This tack welding is done at the foremost point along the strip S towards the free leading end edge 15 which is in contact with the disk edge 13; and thus may be made usually under or at the location of contact of trailing roll 17 with the strip.

When upon full roll advance and strip conformity the roll 17 is in fact quite close to the leading edge 15, as a practical matter the tack weld can occur substantially at the leading end edge itself with little (if any) projection of a tangent portion of the strip between the edge 15 and the point of a weld. However, at times there may be a non-conforming strip end portion which runs out from a point of tangency to the free edge 15.

When the tack weld is completed and chilled, the longitudinal center line of the strip stock S being now fixed and immobilized, usually in the center plane of the disk D for symmetrical rims, (nonetheless there being some support along the length of S to avoid distortion from this preferred condition), the disk D is now power driven, starting from the condition of FIG. 3, in a counter-clockwise direction. Thereby the strip S is drawn between the roll means F (trailing and leading rolls 17 and 18) held advanced under fluid pressure toward and against the edge of the D, so that with strip infeed, it is continually being bent into conformity with the disk edge 13.

Simultaneously with the rim stock continuous infeed, there is a fillet weld bead W being continuously laid between the strip S and the disk D disposed perpendicular thereto; preferably by submerged electric arc welding. Thus in the event that the disk D is vertical, the fillet bead welds are being simultaneously laid on both sides of the disk D. Otherwise, (e.g., for large diameter disks) with the disk plane substantially horizontal, a single bead is laid from the top.

Thus the progressive forming and simultaneous welding proceeds as indicated in FIG. 3, until a complete circuit of the disk, or an entire single rotation, has been achieved.

If desired there may be used an overrun of the disk beyond one turn; especially where, after the initial tack welding, the welding thereafter had proceeded continuously with the disk being driven solely in the counterclockwise rotation, accordingly leaving perhaps some slight portion of the leading end unwelded between the initial tack weld and the leading end edge 15. This overrun carries the complete bead beyond the point of abutment or adjacency of the end edges to the point of the original tack weld.

Thereafter, usually while the thus far completed weldment is yet in working position in the machine, a filler weld may be carried out transversely across the rim thus formed at the adjacent ends inside and/or on the outside thereupon to complete the weldment of the form shown in plan in FIG. 4 and in edge or side view of FIG. 5.

There may of course be variations in these primary steps, depending upon conditions; for example, because of its particular composition or characteristics or thickness, the rim stock bar S may be perhaps pre-heated and kept heated as it is fed into position and welded by the aforegoing steps.

Further, as indicated in some earlier discussion, after the tack weld is made and solidified, if there is an extensive leading free end portion projecting from the point of tangency and conformity with the disk edge, if desired, the disk may be backed up clockwise thus to bring the edge 15 of the leading projecting end about under the trailing roll 17, thereby to conform the entire leading end with the disk edge. From that point then a further tack weld having been made and cooled, the counter-clockwise advance may be started, feeding the strip into conformity with the edge as previously described, with the welding then for a continuous circumferential weld being resumed, or started, shortly beyond the second tack weld and before the first is encountered, or perhaps after the location of the first tack weld is once passed. The final finishing of the weld in this initial region then is attended to as previously described by an overrun of the disk rotation beyond the point or near abuttment of the bar ends passing under the trailing roll 17. Thus the weld bead being laid may be continued without interruption past the abutting edges over the leading end region of the said tack welds.

After the gear blank weldment has thus been completed, it may then be set up in an appropriate machine tool equipment; for machining to closer blank sizes at the periphery and for the rim width, and finally of course to produce the desired tooth formations about its circumference on rim flange 19.

For convenience in the clamping and handling, utilizing the center hole 11 for initial centering, these operations are usually done before placement of the hub 20.

Thereafter a semi-finished gear may be appropriately set up and clamped, utilizing the more precise tooth formageometry about its periphery, for production of an enlarged central hole, either bored or flame cut, to receive a hub stock element, then inserted and welded into place. Either a solid cylinder element, or a tubular element may be used. Then continuing clamping, using the geometry of the finished gear tooth formation, for which the pitch circle has been established, for centering and locating, the hub shaft bore may be precisely machined with other machining operations on the hub region carried out, such as end facing and circumferential finishing and the like.

Of course, thereafter any appropriate heat treating operation may be carried out as usual.

FORMING-WELDING APPARATUS MACHINE OF FIGS. 6-7—HORIZONTAL DISK DISPOSITION

Especially for handling or fabricating large gear blank weldments, for example, on the order of 15-24 feet diameters, generally speaking, it is more convenient from considerations of plant environment, handling of materials and the like, that the web disk be disposed in a substantially horizontal position for rotation about a vertical axis. For this purpose a forming and welding machine of the general form presented by FIGS. 6-7 is appropriate.

The machine or apparatus is intended to be installed on a concrete floor appropriate to support its loaded working weight, with appropriate service or working area thereabout. The floor has as well a pit to accommodate certain parts of the apparatus drive as hereinafter described.

The pit on opposite sides of the frame has appropriate covering such as subway grating G flush with the floor surface.

In the machine, an elongated rigid frame (or body) B comprises a first or bottom narrow rectangular sub-frame 31, and a generally similar top sub-frame 32, provided by large I-beam sections, held in a rigidly spaced horizontal parallel relationship by broad vertically extending short channel section members 33 and 34. A shorter like section I-beam 30 is rigidly secured at its ends in spaced parallel relation below 31 by spacer and gusset means 30a to provide support for drive and transmission means T.

To the bottom of I-beam sub-frame 31 the hollow rectangular tubular cross elements 35 are welded transversely beneath and projecting beyond the I-beam flanges which afford longitudinal parallel integral side-rails 31a-31b; members 35 being appropriately anchored to the concrete construction of the environment by appropriate anchor bolts.

At the frame left end back side (as seen in FIG. 7), the longitudinally extending flanges 31b at the bottom and 32b at the top, have flat aligned vertical outside faces and are provided with series of bolt holes 39, thereby to serve as a support for the heavy base plate 38 of a forming roll carriage assembly F. Thus the base 38 may be secured in fixed adjusted positions (depending upon the size of the work diameter) by selectively bolting along the back flanges 31b and 32a.

The base 38 supports for longitudinal sliding shift a bifurcated roll carriage 40, in which a roll support head 41 is (for some roll "float") pivotally supported by a vertical pivot at 42 between the ears of the carriage. The carriage 40 is longitudinally slidably shiftable on the base 38 (with appropriate longitudinal keying and guiding or slideway engagement) under the fluid power actuation of the cylinder unit such as a double acting hydraulic or pneumatic cylinder or motor 43, with one end fixed to base 38, and other end engaging on the pivot 42 and hence the carriage.

The roll supporting head 41 proper is a box weldment comprises essentially two like parallel plates 41a and 41b with rigid spacing elements therebetween, the plates being bored at the rear end for receiving the pivot shaft 42, extending outwardly through the bored ears of the carriage 40. At its forward end head 41 is provided with two like parallel forming roll sub-assemblies 17 and 18. Each roll assembly (here consider 17, see FIG. 7) is provided by a hollow roll portion 50 extending (parallel to pivot 42) between the forward head ears provided by plates 41a and 41b and rotatable on a shaft 51 fixed endwise in the ears by appropriate collar, pin or set screw means.

Each tubular roller 50 from an unthreaded central part is appropriately threaded with left hand threads on opposite ends to receive the internally threaded heavy annular guide disks 53 and 54 having a threaded engagement on 50, whereby the axial location and the spacing from each other may be varied, as well as their absolute axial locations along 50. Course threads are used (e.g., Acme) with flat crests with diameters equal to the full roll diameter. The two elements 53 and 54 provide the effective rim stock guide flange structures on the roll 17. A similar guide flange structure is provided in leading roll 18. The top and bottom flange disks of course have respective inner faces coplanar. The fixed shaft 51, may be pinned or set screw held in position between 41a and 41b; the interior of hollow roll shaft 50 may be bushed with appropriate bearing material or other bearing support provided; and the elements 53 and 54 threaded on 50 may themselves be held in appropriate selected positions by set screw or other like means.

Essentially the head 41 is movable radially towards and away from a work disk supported in a machine as later discussed, with the axis of the rolls 17 and 18 parallel to the axis of rotation of the workpiece disk.

Appropriate hydraulic controls and hydraulic power means are afforded, not here detailed since many of various conventional appropriate means are suitable.

Offset towards the right end, along the length of the body or framework B, approximately half-way between the right end and the extreme retracted roll position for the rolls and carriage, there is provided the disk workpiece supporting, clamping and driving means C as hereinafter described in detail.

Bottom and top bearing tubes 55, 55a and 56, having aligned vertical axis, are each rigidly securely supported extending through and welded to webs 31w, 30w and 32w of the bottom and top members 32, 30 and 33, at a location offset from the frame center towards the right. The tubes are further stabilized by plates 30p, 31p, and 32p welded between the respective flanges of 30, 31 and 32 and to the tubes; and the tubes have internal bearing means or structures for functions to be described.

The lower bearing tubes 55 and 55a (conveniently called drive bearing support tube means) rotatably support a drive shaft 57. On its top end shaft 57 carries a horizontally disposed, axially fixed torque clamp plate 57a, and near its bottom end (between tubes 55 and 55a) a large driving torque gear 58. With the periphery of gear 58, there is meshed a driving pinion 59, supported by bearing shaft 59s in upper and lower bracket elements 59b as part of the drive means including a gear reduction transmission, control and/or brake unit 60, in turn driven by an electric drive motor 61, for example through an electric sprocket drive chain means 62. Pinion 59 similarly is driven by a chain and sprocket drive 60d from the output of unit 60.

The drive and transmission means, in an extended sense, includes brake means, direction reversing means, and other appropriate speed control devices and the like. Thus the electric motor 61 may, if desirable, be reversible for certain reversing of the drive direction of 58 as may be useful, or a reversing control means may be included in the unit 60. Also braking may be provided, as for example, an electro-magnetic brake included in the motor 61, which is automatically disengaged with energization of the motor for drive purposes and re-engaged upon motor shut-off, or the braking unit as such may be included internally of the unit 60, on the input shaft for example.

The clamping plate 57a preferably has a coaxially centered recess 57c in its top face for reception of and piloting of the lower end of the centering rod 68 hereinafter described, and also a plurality of torque- or drive-pin receiving apertures 57d (see FIG. 8).

In the upper part of the disk clamping means, there is included the tubular slide element 67 axially shiftable in the bearing support tube 56, and on its lower end carrying the axially shiftable clamping plate 67a centrally apertured for extension therefrom of the centering rod 68, and also having apertures located as in lower support plate 57a, for the pins P dropped through 67a, disk D into 57a.

Figure 8:
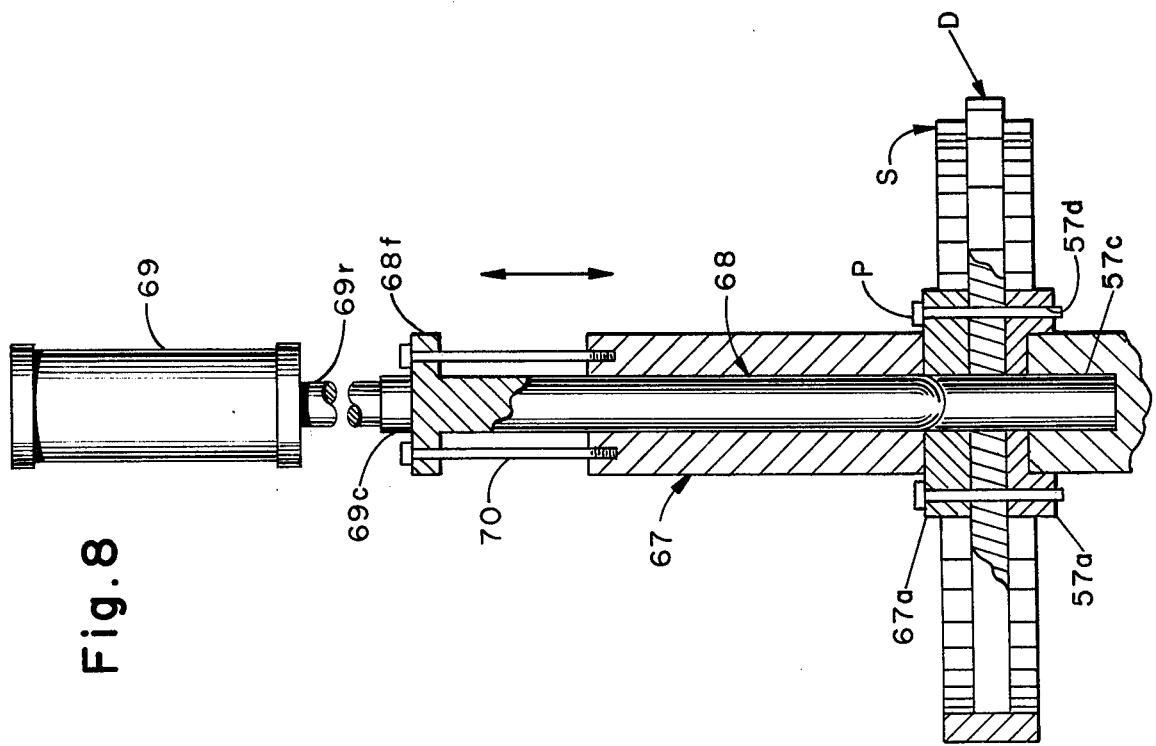
FIG. 8 is a further detailed view of clamp-actuating structure omitted in FIGS. 6-7.

As seen in detail FIG. 8, which for clarity shows the clamping components apart from surrounding structure, for raising and lowering the centering pin or rod 68 there is provided in appropriate reciprocating motor means 69, for example, in environment- or machine frame-supported double-acting, fluid-powered cylinder means, such as a hydraulic cylinder unit, to the piston rod 69r of which the flanged end 68f of the centering pin is attached in alignment. Similarly to advance and retract, i.e., raise and lower, the slideable tubular shaft member 67, a lost motion connection is afforded between the piston rod 69r and flange 68f and threaded into the end of upper plate carrier 67. With springs between 68f and 70, the connection may be adjusted so that in the clamp-released condition the rounded end of 68 projects below plate 67a.

To permit rotation of shiftable clamp plate 67a, without undue wear of other parts such as the piston and seats in 69, a thrust bearing condition is provided as at 69c between piston rod and centering rod flange; or between hollow member 67 and plate 67a.

However, the plate 67a may be effectively raised and lowered and clamped by means of a sort of motor-driven jack screw arrangement, as seen in FIG. 9; where the central recess of clamp plate 57a is continued into, and threaded in the top end of drive shaft 57, to be engaged by a correspondingly threaded end on rod 57. The reduced upper end of rod 67 projects out of a bearing 68b in a lift beam 67B vertically shiftably supported by the machine frame (e.g., as in FIG. 11) and has a chain and sprocket (or belt and pulley) drive connection to a reversible electric motor 68m supported by the beam. Motor driven rotation screws the rod 67 to develop clamping force by the bottom shoulder of 67 engaging plate 67c, or unscrews the same for release. To raise and lower the released clamp plate 67a, fluid cylinder means 67m are provided operating upwardly against the opposite ends of the lift beam.

Out of the path of roll head 41, there may be provided also a table or support means 72 for accepting and supporting the strip stock workpiece S, and holding it in position especially upon start of operation, during initial feed, and until the strip stock has been brought at least at its leading end into conformed relation with the disk edge 13 and thereto attached in proper alignment.

The table or support 72, if used, is of course shiftable longitudinally along the machine frame, supported on or between the beam flanges 31a–31b. The shiftable position of support 72 longitudinally is required to accommodate different sized disk workpiece diameters; this support being also vertically adjustable to accommodate rim strip stock of varying widths as might be used.

Further a welding head H is supported by and beneath the upper member 32, especially by a cross member supported by the longitudinal flanges 32a–32b.

Although gas welding and other types of welding may be used, preferably the head H carries the welding head components requisite for conventional submerged arc welding, where electrode wire is continuously fed from a supply spool into and through a pool of molten flux maintained along the welding path in advance of and at the arc. The head H of course is shiftably adjustable longitudinally along the frame as required to accommodate or serve workpieces of different diameters, while the head components themselves have the usual conventional adjustments for wire angle, wire feed rate, flux discharge rate and aiming.

Where, as is more usual, a single electrode wire is serving as the arc electrode, with current being carried then through the workpieces, in addition to a cable to the welding head, a second cable may be clamped directly to the web workpiece disk, possibly with a further jumper to the flange stock strip, (at least until an initial weld is made).

Or there may be used slip ring collar and feed brush arrangements say on the drive shaft 57 and/or the axially shiftable tube 67, so that current may be transmitted directly through the elements bearing the clamping plates, and so that there is no possibility of harmful current leakage or transfer through the rotatable support bearings in the support tubes 55 and 56.

Appropriate automatic, semi-automatic, or manual controls, or controls with manual override may be used for the several functional organizations, that is, centering and clamping devices, web disk drive control, forming roll advance and retraction and maintenance, welding head feed and current control; and these may be appropriately integrated for the type and degree of automatic operation desired; for by its nature and machine and method is subject to generally automatic control for the major part at least of the operating cycles.

RIM STOCK SECUREMENT VARIATION—FIG. 10

In FIG. 10, there is shown a method and apparatus variation whereby tack welding is avoided, and which therefore especially may be useful when the apparatus is used simply to form rings from strip stock with an appropriately sized disk serving as a form or pattern. An effectively single lever 201 is formed by a spaced pair of parallel bar elements which are removably secured pivotally at their inner ends to opposite sides of the disk (with clamp plate clearance) at an eccentric point 202, and between their outer ends carry a rotatable eccentric locking cam 203, with periphery positionable adjacent the disk edge.

Alternatively, these may be removably pivoted to the outer face of the clamping plates, after the latter are in position, and then are to be removed before separation of the clamping plates.

In any event, with the stock strip S in position against the disk edge and the lever 201 appropriately located in rotational sense, the lever is swung to bring the lock cam 203 over the strip end as shown in FIG. 10, and the cam is rotated toward locking position. These elements are so held, until disk drive rotation is begun, which tightens up the clamping action on the stock against the edge as the lever 201 is in effect drawn back with the cam tending to rotate toward a longer radius to its point of strip contact.

OPERATION—FIGS. 6-9

The base of the forming roll assembly F is set at appropriate location corresponding to the workpiece diameter so that the requisite retraction stroke and advancement into stock-to-disk edge conforming position are within the operational range or stroke of the hydraulic cylinder unit 43. With the guide and centering pin 68 withdrawn, the workpiece disk is inserted into the machine, between the separated clamp plates 57a–67a, by appropriate external manipulation means as required by the size and mass of the work disk D, whether by manual effort or a work crew, or by industrial forklift truck or other machine equipment.

The upper plate may be lowered to contact the web disk, which is then shifted until drive hole alignment is sufficient to receive torque or drive pins P. Or if the guide rod 68 is set to project slightly downwardly, it may be initially a visual centering guide to aid approximating centered position of the work. Then when the disk aperture 11 is sufficiently under the rounded or pointed end of rod 68, further actuation of its motor to drive it downwardly into or towards the aperture 57c of the lower plate, both can and will move the workpiece disk into precise centered position.

The workpiece disk is then rotated until its apertures 12 are aligned with drive engagement apertures 57d of the lower plate, the upper clamp plate 67a is then brought downward into proximity with the work disk, and rotated to align its holes 67d with the disk holes 12, so that the headed drive or torque pins P may be dropped therethrough into aligned holes 12 and 57d of the workpiece and lower clamping plate. Then by final extension and clamping actuation of the motor 69, the plate 67a is forced into firm clamping relationship upon the disk to maintain it in horizontal plane perpendicular to or at least perpendicular to the aligned axis of the bearing support tubes 55 and 56. Where a cable connection is made directly to the work, the cable end is then clamped or otherwise secured to at least the disk workpiece.

An appropriate stock strip S is placed edgewise on the surface of support 72, with its free end portion projection in proximity to, if not touching, the disk edge 13; and the strip front or leading end is so placed that, upon advancing of the forming roll carrying head 41, the rolls pick up the strip between flanges 53 and 54 and thus carry the engaged part of the strip stock toward and finally against the disk edge.

Therefore roll advance effects in the stock length intervening between the rolls, a conforming with the corresponding edge arc; and then preferably the leading end edge 15 lies just outside of, in advance of, but quite close to, the tangent point of the roll means 17.

The formed leading stock end is secured to the disk edge by a tack weld placed close to the leading edge, at a location where the strip is yet conformed to the edge arcuate shape. The tack weld may be made manually or by appropriate manipulation of the welding head and its controls.

After the tack weld has itself chilled, the torque gear drive is turned on, welding head action is initiated, and accordingly the remainder of the strip stock is drawn under the forming rolls into conformed relationship with the work disk edge, at the same time the welding head proceeding with a continuously formed and laid submerged arc welded bead.

If, at the start of operations, for any reason the welding bead has not been laid between the extreme leading edge 15 and a first tack weld, then rotation of the work disk web may be continued to carry the weld being laid on past the adjacent ends of the strip stock, past the trailing end, on up to the initial tack weld. In any event at the completion of the circumferential welds, thereafter either by appropriate distinct manipulation of the welding head H, or by separate arc or manual welding means, the adjacent leading and trailing ends of S are welded together as by penetrating welds on the inner circumference of the now formed blank flange and/or by a filler weld transversely across the outer width of the new formed flange 19 (in FIGS. 4-5).

In the event that, upon initial application and tack welding of the leading end portion of strip S to the work web disk, there is in fact a notable portion of the front end projecting out from a point of tangency with the disk edge, say at about a location of the roll means 17, after appropriate tack welding has been done amply to secure S to the edge, then the disk may be driven in a reverse direction, that is clockwise in FIGS. 1-3, to carry that projection portion on under the normally trailing roll 17, whereby conforming also the very initial front or lead portion of the strip to the edge.

As the extreme front edge is thus held conformed, further tack welding may be done on it, and then the forward or counter-clockwise drive initiated along with the continuous welding as previously described to lay the bead around the entire circumference as the strip is brought into conforming relationship, with overrun as may be useful or needful, beyond the point of adjoining of the strip ends.

When the rim flange stock S has thus been applied by the forming rolls conformed to the disk edge and welded thereto over the complete circumference, and the adjacent end welds made, after retraction of the forming rolls, the clamping operations are reversed and any welding clamps or cables removed from the work where such are used; the welding head H is withdrawn; and the entire clamping and centering apparatus thus separated.

The now partially completed blank can be removed, turned over and replaced for reclamping in the manner previously described; and thereupon the welding head may be brought into position. With the disk torque drive again initiated, and the welding head in operation, the fillet type welding bead then again is made on the second side between the now formed rim flange 19 and the disk.

Upon completion of this operation, the work is removed from the machine providing a gear blank weldment, which may be subjected, if desired, to heat treating for stress relieving. Then with the disk portion again clamped with centering by its hole 11, the blank flange 19 is usually turned, machined to a desired width dimensioning, and also turned circumferentially on its outer face; and then finally the teeth machined about its entire circumference.

Thereafter usually a large central hub-stock-receiving aperture is formed, again by precision torch cutting or by boring; and a cylindrical hub stock piece is emplaced in and welded in that central aperture thus formed. Finally the definitive machining operations on the hub are carried out; i.e., end facing the hub, turning its circumference as desired, but especially boring or reaming a finished central shaft-receiving aperture axially through the hub. For this purpose, the semi-finished gear may be clamped or positioned by virtue of the precision geometry of its already formed toothed circumference.

MACHINE OF FIGS. 11-12 VERTICAL WORK DISK DISPOSITION

Figure 12:
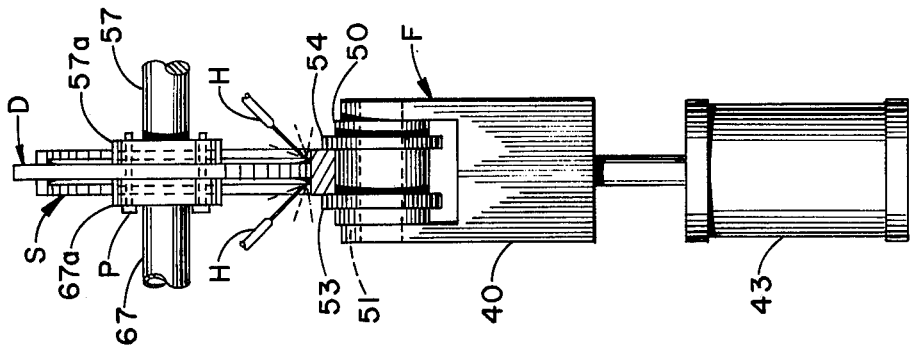
FIG. 12 is a schematic enlarged view showing the forming roll structure and the welding heads of FIG. 10.
Figure 11:
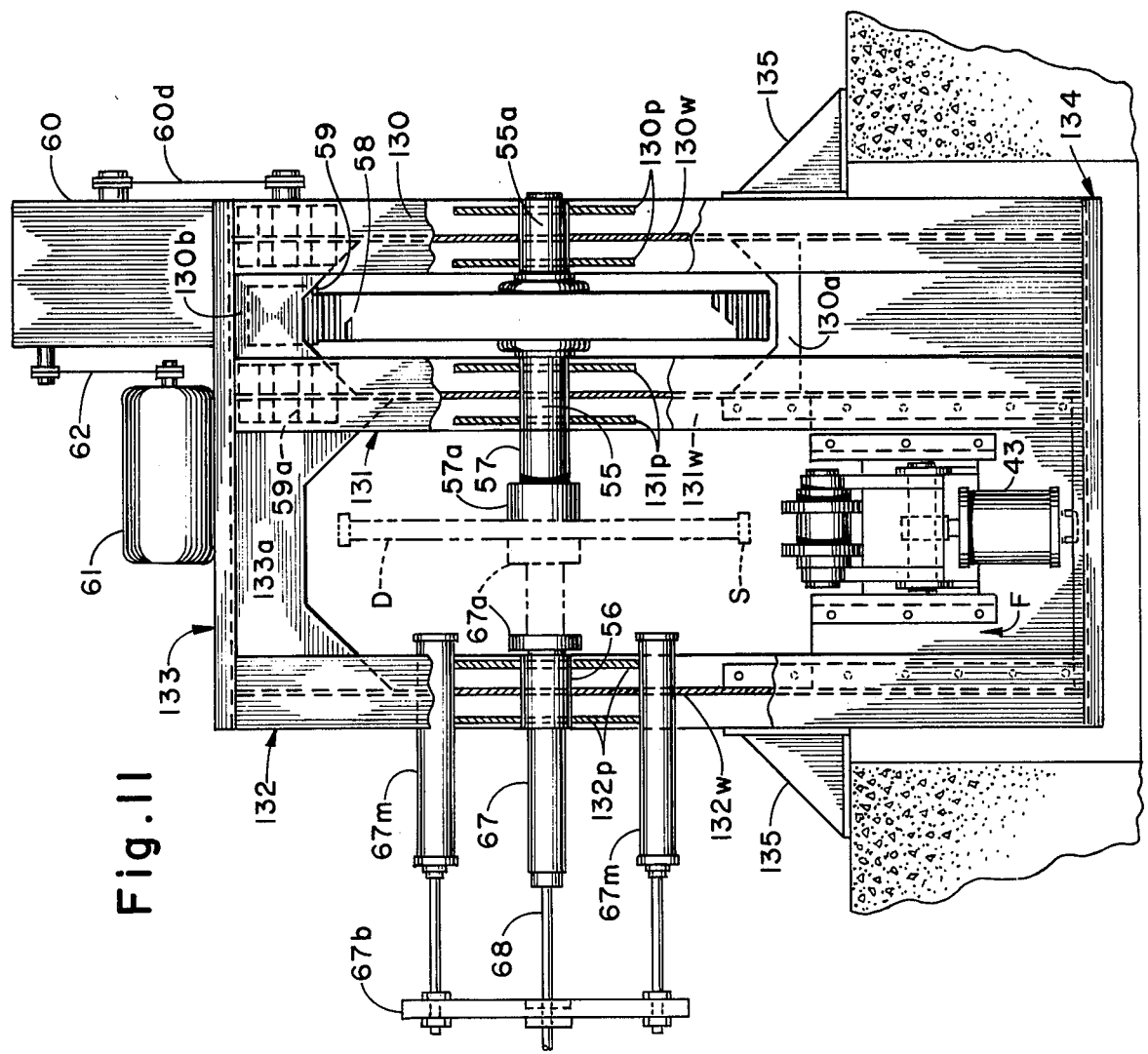
FIG. 11 is a side end elevational view of a second form of machine apparatus, wherein the web disk workpieces are received and supported in vertical disposition for rotation about a horizontal axis.

The apparatus of FIGS. 11-12, in which the web workpiece disk is disposed in a vertical plane for rotation about the horizontal axis, may be an especially convenient arrangement when the gears or gear blanks are not to exceed say about five or six feet in diameter.

This form of apparatus has moreover a further advantage that the straight web flange stock may be fed in at the lowermost or bottom region of the rotating disk (or obliquely inward downward toward that region); but in any event the arrangement is such that at the instantaneously bottommost region of the disk, rim flange stock is already in conformed shape and disposition to the edge 13, so that the preferred submerged arc welding may be carried out simultaneously to lay a fillet bead on both sides of the disk onto the rim stock. (See FIG. 12).

This machine basically comprises components similar to those described for the horizontal machine form of FIGS. 6-7; the elements then being referred to by identical reference letters or numerals where there is quite close similarity, or at times by the same reference numerals prefixed by 1, that is, by one hundred higher.

The apparatus body or frame longitudinal members, I-beam sections 130, 131 and 132, here are of the same length, and are spanned at respective ends by welded-on top and bottom channel section members 133 and 134. Welded top spacer and reinforcing plates 133b are used between 130, 131 and 132, with similar plates 133a between 131, 132 and 133; while below torque gear 58, one or two spacer plates 130 are used between 130-131. Again bearing support tube stabilizing plates 130p, 131p and 132p are used for the aligned tubes 55a, 55 and 56 through the I-beam webs 130w, 131w and 132w. Opposite brackets 135, welded onto frame members 130 and 132, anchor the machine at the edge of a receiving pit in the concrete floor.

The shaft 59a, carrying the drive pinion 59 for driving torque gear 58, is again supported in bearing brackets on the far side flanges of frame members 130-131; and the reversible drive transmission motor 61 and gear reduction unit 60 are mounted on the top end frame member 133.

The forming roll head assembly F is now located in the frame bottom region for vertical reciprocation and bolted adjustment of its base 38 along frame members of subframes 131-132, basically for operations as previously described. Base 38 provides a slidway for carriage 40 again with the roll-carrying head 41 pivoted at 42; hydraulic cylinder 43 being pivoted to pin 42 and base 38. The roll assemblies in F for FIGS. 11-12 may be identical with those in FIGS. 6, 7 and 8.

Thus two welding heads H, H, (see FIG. 12) are provided on respective sides of the location for the disk D. An appropriate support element for rim stock strip S may be provided out of the path of travel for the forming roll head.

Here in FIG. 11, the clamping mechanism and actuation is that described for FIG. 9; with FIG. 11, indeed showing the disposition of the lift cylinder motor means 67m shown only symbolically in FIG. 9. But for the rest of the actuating mechanism, especially components carried on beam 67B, see FIG. 9 and as well the entire description previously given for FIG. 9. However, the arrangement of FIGS. 6-8 may be here used.

OPERATION—11-12

The operation of the "vertical machine" of FIGS. 11-12 is basically identical to that of FIGS. 6-7, but the essential difference being that the welding of the rim stock to the web disk edge is carried out by the simultaneous twosided weldings in the single rotation of the disk.

Modifications, changes and improvements to the present forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

I claim:

1. A method for fabricating of gear blanks, including the steps of: producing a circularly-edged gear web plate disk; supporting the circular web disk for rotation about a central axis perpendicular to its plane; advancing a strip of elongated flat rim flange stock into a position with one end adjacent the edge of the web disk; in said position the plane of the strip being perpendicular to the plane of the web disk; forming the said end of the strip by advancing a spaced pair of parallel-axed forming rolls to engage and carry it against and arcuately shape it to the edge of the web disk; securing the rim strip in its portion arcuately conformed to the web disk and proximate to the actual end edge; driving said web disk rotationally with said one end as the strip leading end to draw the remainder of the said strip beneath the forming rolls, while the forming rolls are applied to the strip to keep, and form, the strip against the web edge; welding a substantially continuous bead between the rim strip and the web disk as the strip has thus continuously been formed to the disk periphery; and continuing the web drive for roll forming of the rim strip stock and the simultaneous welding until a trailing end edge of the strip stock is brought into juxtaposed relation with the lead end edge to complete a rim on the disk, thereby to produce a weldment gear blank.

2. A method with steps as described in claim 1, and wherein said securing step is carried out by tack-welding the rim strip end portion to the disk edge.

3. In a method for producing large diameter gears with steps as described in claim 1, the further step of welding the adjacent ends of the rim after it has been entirely formed to and welded to the disk edge.

4. A method with steps as described in claim 1, wherein said gear web disk is produced by precision oxygengas torch cutting from appropriately thick plate stock, said rim strip stock is precut to length of the disk circumference, and during said advancing step the width of the rim stock is substantially centered on the edge of the web disk.

5. A method including the steps as described in claim 1, and including the further subsequent steps of machining the gear blank toward desired final gear dimensions, and machining requisite gear teeth in the rim periphery.

6. A method as described in claim 5, including the steps of providing a center aperture in the web disk, emplacing and welding a gear hub component in said center aperture, and finishing said hub by machining hub end faces and a shaft aperture therein concentric with the formed gear tooth pitch circle.

7. A method including steps as described in claim 2, wherein after the initial arcuate forming of the rim strip to the periphery of the web disk and the said tack-welding near the lead end and delay for tack-weld solidification, the web disk is driven a short distance to bring the actual extreme leading end back under a first-encountered forming roll thereby to form any projecting leading end portion closely to the disk edge, thereupon welding the extreme leading rim strip end to the disk edge and allowing web solidification, and then proceeding with the continuous drive of the disk and the weld application as described.

8. A method including the series of steps as described in claim 1, wherein said web disk is supported substantially horizontally for rotation about a substantially vertical axis in carrying out said series of steps, the said welding being carried out first on one side of the disk for a complete rotation of the disk; and thereafter, upon completion of the full circuit of welding, the partially finished blank is inverted and then again with the plane of the web plate horizontal, driven through a complete turn, with continuous welding between the rim and the disk being again carried out on the other side of the disk.

9. A method including the steps as described in claim 1, wherein said series of steps is carried out with the plane of the web disk plate substantially vertical, that is, with the web plate rotationally driven about a horizontal axis.

10. In a method including the steps as described in claim 1, the further steps of initially providing said web disk with a central aperture as a centering formation, and also drive-means engagement apertures spaced from said central aperture, positioning said disk in rotational clamping and support means, centering the disk in the support means by insertion of a centering rod through said centering aperture, and thereupon clamping said disk in the support means.

11. A method including steps described in claim 10, wherein a torque transmission element is engaged in one of said drive engagement apertures.

* * * * *